(12) United States Patent
Razavi

(10) Patent No.: US 7,666,959 B2
(45) Date of Patent: Feb. 23, 2010

(54) DUAL SITE CATALYST SYSTEM COMPRISING A HAFNOCENE COMPONENT FOR THE PRODUCTION OF BIMODAL POLYOLEFINS IN A SINGLE REACTOR

(75) Inventor: Abbas Razavi, Mons (BE)

(73) Assignee: Total Petrochemicals Research Feluy, Feluy (BE)

( * ) Notice: Subject to any disclaimer, the term of this patent is extended or adjusted under 35 U.S.C. 154(b) by 30 days.

(21) Appl. No.: 10/529,249

(22) PCT Filed: Sep. 24, 2003

(86) PCT No.: PCT/EP03/10712

§ 371 (c)(1),
(2), (4) Date: Sep. 1, 2005

(87) PCT Pub. No.: WO2004/029101

PCT Pub. Date: Apr. 8, 2004

(65) Prior Publication Data

US 2006/0068985 A1 Mar. 30, 2006

(30) Foreign Application Priority Data

Sep. 27, 2002 (EP) .................................. 02079063

(51) Int. Cl.
*C08F 4/70* (2006.01)
*C08F 4/76* (2006.01)
*B01J 31/28* (2006.01)
*B01J 31/38* (2006.01)

(52) U.S. Cl. .................. 526/115; 526/113; 526/114; 526/117; 526/160; 526/170; 526/161; 526/172; 526/130; 526/169.1; 526/941; 526/943; 502/129; 502/113; 502/103; 502/117

(58) Field of Classification Search ................. 502/117, 502/118, 129, 113; 526/115, 114, 116, 117, 526/113, 943, 160, 161, 172, 170, 166, 118, 526/123
See application file for complete search history.

(56) References Cited

U.S. PATENT DOCUMENTS 4,975,403 A 12/1990 Ewen
5,679,811 A * 10/1997 Winter et al. .................. 556/7

(Continued)

FOREIGN PATENT DOCUMENTS

DE 198 23 871 A1 * 12/1999

(Continued)

OTHER PUBLICATIONS

George J. P. Britovsek, Michael Bruce, Vernon C. Gibson, Brian S. Kimberley, Peter J. Maddox, Sergio Mastroianni, Stuart J. McTavish, Carl Redshaw, Gregory A. Solan, Staffan Stromberg, Andrew J. P. White, and David J. Williams, Iron and Cobalt Ethylene Polymerization Catalysts Bearing 2,6-Bis(Imino)Pyridyl Ligands: Synthesis, Structures, and Polymerization Studies, Journal of the American Chemical Society, 1999, pp. 8728-8740, vol. 121, American Chemical Society.

(Continued)

*Primary Examiner*—David Wu
*Assistant Examiner*—Rip A. Lee
(74) *Attorney, Agent, or Firm*—Diane L. Kilpatrick-Lee

(57) ABSTRACT

The present invention discloses a metallocene catalyst system for producing polyolefins comprising: A. a hafnocene-based catalyst component suitable for producing the high molecular weight fraction of the polyolefin; B. one or more metallocene or post-metallocene components different from the component A and suitable for producing the low molecular weight fraction of the polyolefin; C. an activating agent having a low or no coordinating capability.

16 Claims, 2 Drawing Sheets

Figure 1:
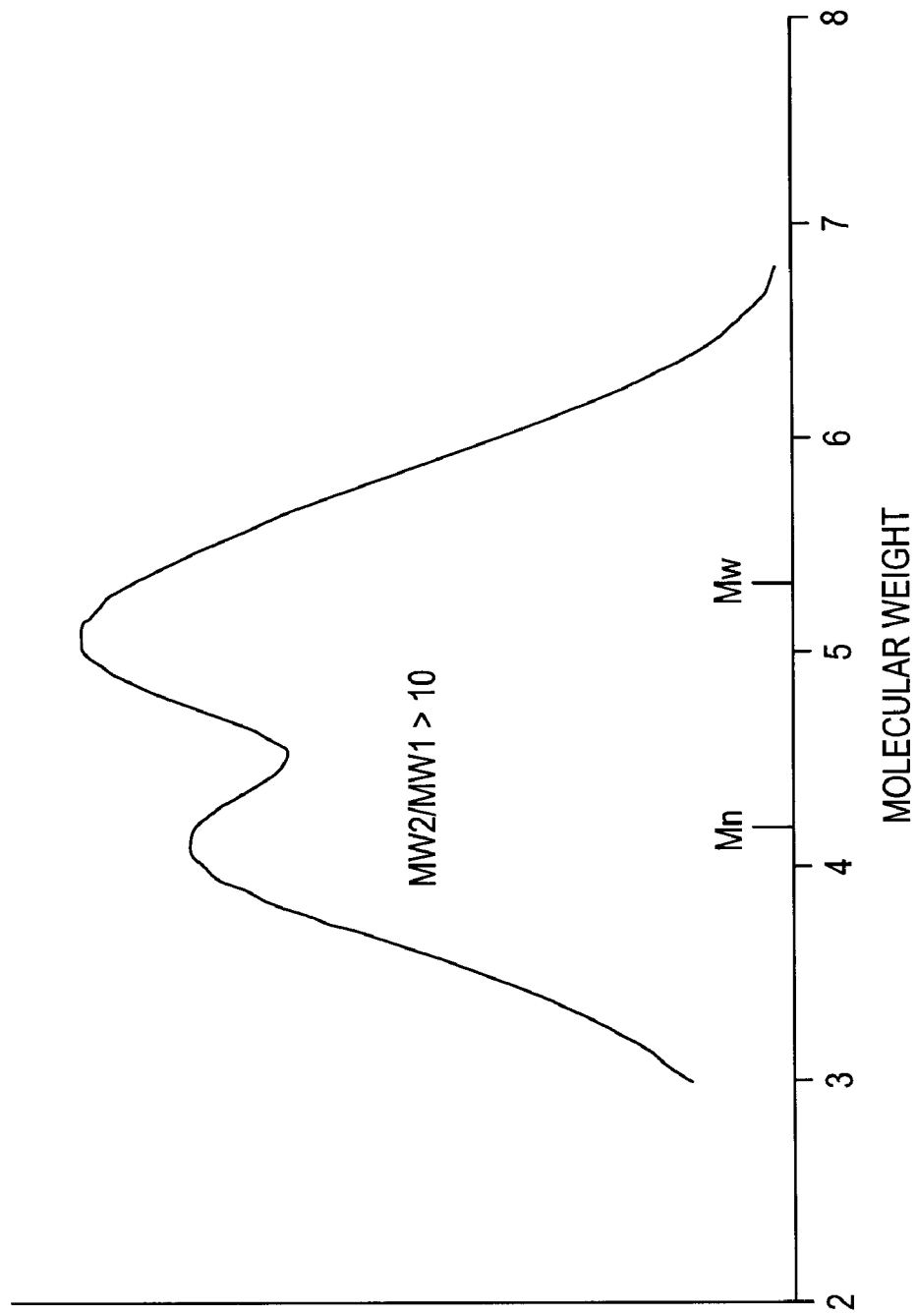

| M | R1 | R2 | R3 | R4 |
|---|----|----|----|----|
| Fe | Me | i-Pr | i-Pr | H |
| Fe | Me | Me | Me | H |
| Fe | Me | Me | Me | Me |
| Fe | Me | Me | H | Me |
| Fe | H | Me | Me | H |
| Co | Me | i-Pr | i-Pr | H |

U.S. PATENT DOCUMENTS

| | | | |
|---|---|---|---|
| 5,719,241 A | 2/1998 | Razavi et al. | |
| 6,136,743 A * | 10/2000 | Sugimura et al. | 502/113 |
| 6,194,341 B1 * | 2/2001 | Canich et al. | 502/113 |
| 6,248,845 B1 * | 6/2001 | Loveday et al. | 526/113 |
| 6,262,196 B1 * | 7/2001 | Mecking | 526/114 |
| 6,291,608 B1 * | 9/2001 | Eilerts et al. | 526/115 |
| 6,346,575 B1 | 2/2002 | Debras et al. | |
| 6,380,311 B1 | 4/2002 | Razavi et al. | |
| 6,448,349 B1 | 9/2002 | Razavi | |
| 6,465,386 B1 * | 10/2002 | Maddox et al. | 502/155 |
| 6,608,140 B2 * | 8/2003 | Christie et al. | 525/191 |
| 6,870,015 B2 * | 3/2005 | Oshima et al. | 526/114 |

FOREIGN PATENT DOCUMENTS

| | | | |
|---|---|---|---|
| DE | 199 60 123 A1 * | 6/2001 | |
| DE | 100 17 663 A1 * | 10/2001 | |
| EP | 0 277 004 A1 | 8/1988 | |
| EP | 0 427 696 A2 | 5/1991 | |
| EP | 0 588 404 A2 | 3/1994 | |
| JP | 10330412 | 12/1998 | |
| WO | WO 99/46302 A1 * | 9/1999 | |
| WO | WO 99/50318 A1 * | 10/1999 | |
| WO | WO 2004/029101 A1 | 4/2004 | |

OTHER PUBLICATIONS

You-Xian (Eugene) Chen, Matthew V. Metz, Liting Li, Charlotte L. Stern, and Tobin J. Marks, Sterically Encumbered (Perfluoroaryl) Borane and Aluminate Cocatalysts for Tuning Cation-Anion Pair Structure and Reactivity in Metallocene Polymerization Processes. A Synthetic, Structural, and Polymerization Study, Journal of the American Chemical Society, 1998, pp. 6287-6305, vol. 120, American Chemical Society.

Eugene You-Xian Chen and Tobin J. Marks, Cocatalysts for Metal-Catalyzed Olefin Polymerization: Activators, Activation Processes, and Structure-Activity Relationships, Chem. Rev., pp. 1391-1434, vol. 100, American Chemical Society.

* cited by examiner

| M | R1 | R2 | R3 | R4 |
|---|----|----|----|----|
| Fe | Me | i-Pr | i-Pr | H |
| Fe | Me | Me | Me | H |
| Fe | Me | Me | Me | Me |
| Fe | Me | Me | H | Me |
| Fe | H | Me | Me | H |
| Co | Me | i-Pr | i-Pr | H |

DUAL SITE CATALYST SYSTEM COMPRISING A HAFNOCENE COMPONENT FOR THE PRODUCTION OF BIMODAL POLYOLEFINS IN A SINGLE REACTOR

The present invention relates to a hafnocene-based metallocene catalyst component and a catalyst system for use in the preparation of polyolefins having a broad or multi-modal molecular weight distribution. The invention further relates to a process for the polymerisation of olefins using the catalyst component in a catalyst system.

Polyolefins such as polyethylenes having a high molecular weight generally have improved mechanical properties over their lower molecular weight counterparts. However, high molecular weight polyolefins can be difficult to process and can be costly to produce.

For many high density polyethylene (HDPE) applications, polyethylene with enhanced toughness, strength and environmental stress cracking resistance (ESCR) is important. These enhanced properties are more readily attainable with high molecular weight polyethylene. However, as the molecular weight of the polymer increases, the processibility of the resin decreases. By providing a polymer with a broad or bimodal MWD, the desired properties that are characteristic of high molecular weight resin are retained while processability, particularly extrudability, is improved.

There are several methods for the production of bimodal or broad molecular weight distribution resins: melt blending, reactor in series configuration, or single reactor with dual site catalysts. Melt blending suffers from the disadvantages brought on by the requirement of complete homogenisation and high cost. Use of a dual site catalyst for the production of a bimodal resin in a single reactor is also known.

Metallocene catalysts are known in the production of polyolefins. For example, EP-A-0619325 describes a process for preparing polyolefins such as polyethylenes having a multimodal or at least bimodal molecular weight distribution. In this process, a catalyst system comprising at least two metallocenes is employed. The metallocenes used are, for example, a bis(cyclopentadienyl) zirconium dichloride and an ethylene-bis(indenyl) zirconium dichloride. By using the two different metallocene catalysts in the same reactor, a molecular weight distribution is obtained which is at least bimodal.

EP-A-0881237 discloses the production of bimodal polyolefins with metallocene catalysts in two reaction zones. The metallocene catalyst component comprises a bis-tetrahydro indenyl compound. That specification discloses multimodal polyolefin resins having a density that falls in the range of 0.9 to 0.97 g/ml, preferably 0.92 to 0.97 g/ml a HLMI that falls within the range 0.1 to 45,000 g/10 min, preferably in the range 0.4 to 45,000 g/10 min. Thus, that specification discloses the production of polyolefin resins having a wide variety of properties.

EP-A-0989141 also discloses a process for the preparation of polyethylenes having a multimodal molecular weight distribution. The catalyst may employ a metallocene catalyst comprising a bis-tetrahydroindenyl compound as disclosed in EP-A-0881237. The specification discloses the production of pipe resins. Although the pipe resins disclosed had good mechanical properties, there is still a need to improve the mechanical properties. There is a need to produce a polyethylene resin having improved mechanical properties yet with good processibility.

Polyethylene resins are known for the production of pipes. Pipe resins require high resistance against slow crack growth as well as resistance to crack propagation yielding impact toughness.

Pipe resins are known in the art which are referred to by the names "PE 80" and "PE 100". These are polyethylene resins which when formed into pipes of specific dimensions, survive a long term pressure test at different temperatures for a period of 5,000 hours. Extrapolation shows that they have a 20° C.-50 years resistance of at least 8 and 10 MPa, respectively. This classification is described in ISO 9080 and ISO 12162. It is known in the art that the key components for a good PE 100 resin are the blending of a low molecular weight high density polyethylene with little or no short chain branching (SCB) due to comonomer incorporation and a linear low density polyethylene (LLDPE) resin with high molecular weight and SCB. Known pipe resins have a trade off between mechanical properties and processibility. Despite this, there is still a need to improve known pipe resins.

Resins produced with these improved metallocene catalysts components display improved mechanical properties because of their high molecular weight. In addition they have improved processing capabilities. There is however room for improvement.

It has been observed that hafnocene-based metallocene catalyst components can be used in catalyst systems that produce polyolefins with very high molecular weight because they have a better capability to incorporate comonomer such as hexene or butene than the other metallocene catalyst systems. Their activity is however prohibitively low.

There is thus a need to improve the activity of the catalyst systems comprising hafnocene-based catalyst components.

It is an object of the present invention to improve the activity of the catalyst systems comprising hafnocene-based catalyst components.

It is another object of the present invention to produce catalyst systems capable of preparing polyolefins with broad, bi- or multi-modal molecular weight distribution.

It is further object of the present invention to produce catalyst systems capable of preparing polyolefins with a high molecular weight fraction and a low molecular weight fraction.

It is yet another object of the present invention to provide a catalyst system comprising a catalyst component that has a very high comonomer incorporation to prepare the high molecular weight fraction of the polyolefin and a catalyst component that has a good hydrogen response to prepare the low molecular weight fraction of the polyolefin.

Accordingly, the present invention discloses an active catalyst system comprising:
- a hafnocene-based catalyst component suitable for producing the high molecular weight fraction of the polyolefin;
- one or more metallocene or post-metallocene catalyst components different from component A and suitable for producing the low molecular weight fraction of the polyolefin;
- an activating agent having a low or no co-ordinating capability.

The hafnocene-based metallocene components of the present invention have a structure according to the formula:

$$R''_s(CpR_n)_g(CpR_n)MQ_{3-g} \qquad (I)$$

wherein
- each Cp is a substituted or unsubstituted cyclopentadienyl ring;
- each R is the same or different and is hydrogen or a hydrocarbyl radical such as alkyl, alkenyl, aryl, alkylaryl or arylalkyl radical containing from 1 to 20 carbon atoms or two carbon atoms are joined together to form a C4-C6 ring;

R" is a structural bridge between two Cp rings;

M is hafnium;

Q is a hydrocarbyl radical such as aryl, alkyl, alkenyl, alkylaryl or arylalkyl radical having from 1 to 20 carbon atoms, a hydrocarboxy radical having from 1 to 20 carbon atoms or a halogen and can be the same or different from each other;

s is 0 or 1, g is 0, 1 or 2 and s is 0 when 9 is 0, n is 4 when s is 1 and n is 5 when s is 0.

By substituted, it is meant that any of the positions on the cyclopentadienyl derivative may comprise a substituent in place of a hydrogen atom. This may be either within the five-membered cyclopentadienyl ring or, if the ligand is for example an indenyl, a tetrahydroindenyl or a fluorenyl, this may be on a carbon atom in the ring system outside of the five-membered ring.

Each catalyst component comprises two or more cyclopentadienyl derivatives that may be the same or different.

The particular cyclopentadienyl ligands on the metallocene catalyst lead to the advantage of the present invention.

In the present invention, the type of cyclopentadienyl derivative is not especially limited. Thus, in preferred embodiments of the present invention, the Cp's may be independently selected from cyclopentadienyl-type groups, indenyl-type groups and fluorenyl-type groups. In the present disclosure, cyclopentadienyl-type group is meant to be a single substituted or unsubstituted cyclopentadienyl ring system and not a fused ring system such as indenyl or fluorenyl systems.

The type of bridge present between the ligands in the present catalyst component is not particularly limited. Typically R" comprises an alkylidene group having from 1 to 20 carbon atoms, a germanium group (e.g. a dialkyl germanium group), a silicon group (e.g. a dialkyl silicon group), a siloxane group (e.g. a dialkyl siloxane group), an alkyl phosphine group or an amine group. Preferably, the substituent on the bridge comprises a hydrocarbyl radical having at least one carbon, such as a substituted or unsubstituted ethylenyl radical, for example —CH$_2$—CH$_2$— (Et). Most preferably R" is Et or Me$_2$Si.

Q is preferably a halogen and most preferably it is Cl.

The substituent or substituents present on the ligands are not particularly limited. If there is more than one substituent, they can be the same or different. Typically, they are independently selected from an hydrocarbyl group having from 1 to 20 carbon atoms. Amongst the preferred substituents, one can cite methyl (Me) groups, phenyl (Ph), benzyl (Bz), naphtyl (Naph), indenyl (Ind), benzendyl (BzInd), as well as Et, n-propyl (n-Pr), iso-propyl (I-Pr), n-butyl (n-Bu-, tert-butyl (t-Bu), silane derivatives (e.g. Me$_3$Si), alkoxy preferably given by the formula R—O where R is an alkyl having from 1 to 20 carbon atoms, cycloalkyl and halogen. Preferably there are at most two substituents on each Cp ring.

The position of the substituent or substituents on the ligands is not particularly limited. The ligands may thus have any substitution pattern including unsubstituted or fully substituted. However, when Cp is a cyclopentadienyl-type group, the substituents are preferably in the 3- and/or 5-positions or in the 2- and/or 4-positions. When Cp is a fluorenyl-type group, the substituents are preferably in the 3- and/or 6-positions or in the 2- and/or 7-positions. When Cp is an indenyl-type group, the substituents are preferably in the 2- and/or 4-positions.

In another embodiment according to the present invention, the hafnocene catalyst component may be described by the formula

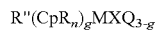   (II)

wherein R", Cp, Rn, M and Q have already been defined and wherein X is an hetero atom ligand with one or two lone pair electrons and selected from the group VA or VIA. Preferably, X is nitrogen, phosphorus oxygen or sulfur and it can be substituted or unsubstituted.

The other one or more metallocene catalyst component(s) can be defined by the general formula (I) or (II), wherein M is a metal from group IIIB, IVB, VB or VIB of the Periodic Table. Preferably, M is zirconium or titanium, hafnium or vanadium with the restriction that if M is hafnium, the two hafnocene-based catalyst components are different. More preferably, M is zirconium. The additional metallocene catalyst component has a good response to hydrogen and is responsible for the low molecular weight fraction of the final polyolefin. Preferably, it is unbridged and substituted. More preferably, at least one of the substituents is bulky.

Alternatively, the other one or more catalyst component(s) can be a new single site catalyst component such as described for example in Britovsek et al. (Britovsek, G. J. P., Gibson, V. C., Kimberley, B. S., Maddox, P. J., McTavish, S. J., Solan, G. A., White, A. J. P. and Williams, D. J., in J. Chem. Coc., Chem. Commun., 849, 1999.). These new catalyst components include iron and cobalt complexes of the 2,6-bis(imino) pyridyl ligand, comprising two 2,6-diisopropylaniline groups linked to a 2,6-substituted pyridine group, thus forming a tridentate ligand as represented in FIG. 1. The substituents on the two diisopropylaniline groups can be the same or different and typically, they can be selected from hydrogen, methyl or iso-propyl, preferably they all are methyl. Preferably, the metal is iron because the complexes based on iron do not incorporate the comonomer, thereby producing a polyolefin of high crystallinity. In addition, the comonomer reacts with the iron-based complexes as a chain transfer thereby favouring the formation of a very low molecular weight fraction: is not incorporated in the high density, low molecular weight fraction. As a result, little or no hydrogen is necessary to produce the low molecular weight, high density fraction as the comonomer acts as hydrogen.

Figure 2:
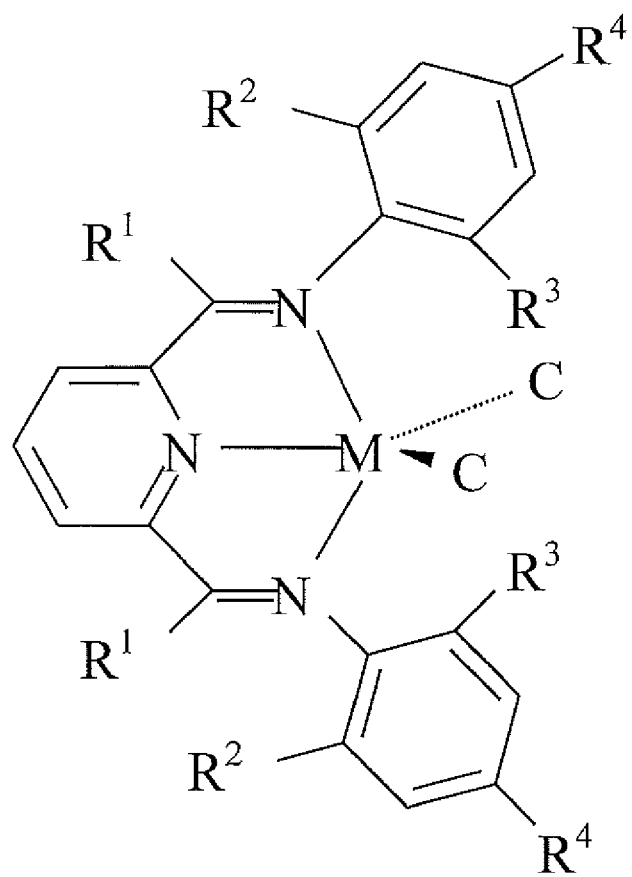

FIG. 2 represents a tridentate ligand and a list of possible substituents.

The catalyst system of the present invention comprises one hafnocene-based catalyst component and at least one other metallocene or post-metallocene catalyst component. It comprises, in addition to the above catalyst components, one or more activating agents having an ionising action and capable of activating the metallocene catalyst components. The activating agents of the present invention are selected from spherically-shaped anionogenic agents that can distribute the negative charge evenly and that have a low or no co-ordinating capability. Preferably, they are selected from borates, boranes and aluminates or mixtures thereof.

Suitable boron-containing compounds activating agents may comprise triphenylcarbenium boronate, such as tetrakis-pentafluorophenyl-borato-triphenylcarbenium as described in EP-A-0,427,696

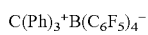

These activators are highly effective for olefin polymerisation, but they can suffer from poor thermal stability. Functionalised fluoroarylborate salts are preferred as they have improved solubility in hydrocarbons and improved thermal stability while keeping an excellent efficiency for olefin polymerisation.

Other suitable boron-containing activating agents are described in EP-A-0,277,004. They can be represented by the general formula:

$[L'-H]^+[BAr_1Ar_2X_3X_4]^-$ wherein L' is a neutral Lewis base, H is a hydrogen atom, $[L'-H]^+$ is a Brønsted acid, B is boron in a valence state 3, $Ar_1$ and $Ar_2$ are the same or different and are aromatic or substituted aromatic hydrocarbon radicals containing from 6 to 20 carbon atoms and may be linked to each other through a stable bridging group, and $X_3$ and $X_4$ are radicals selected independently from the group consisting of hydride radicals, halide radicals, with the proviso that only $X_3$ or $X_4$ will be halide at the same time, hydrocarbyl radicals containing from 1 to 20 carbon atoms, substituted hydrocarbyl radicals containing from 1 to 20 carbon atoms, wherein one or more of the hydrogen atoms is replaced by a halogen atom, hydrocarbyl-substituted metal radicals wherein each hydrocarbyl substitution contains from 1 to 20 carbon atoms and wherein the metal is selected from group IVA of the Periodic Table of the Elements.

Suitable aromatic radicals $Ar_1$ and $Ar_2$ may include phenyl, naphtyl or anthracenyl radicals, and suitable substituents on the aromatic radicals may include hydrocarbyl radicals, organometalloid radicals, alkoxy radicals, alkylamido radicals, fluoro- and fluoro-hydrocarbyl radicals and radicals such as those that can be useful as $X_3$ and $X_4$. The substituents may be ortho-, meta- or para-, relative to the carbon atom bonded to the boron atom.

When either or both $X_3$ and $X_4$ are hydrocarbyl radical(s), each may be the same or a different aromatic or substituted aromatic radical, the same or a different straight or branched alkyl, alkenyl or alkynyl radical having from 1 to 20 carbon atoms, the same or a different cyclic hydrocarbon radical having from 5 to 8 carbon atom, or an alkyl-substituted cyclic hydrocarbon having from 6 to 20 carbon atoms, the same or a different alkoxy or dialkylamido radical wherein the alkyl portion has from 1 to 20 carbon atoms, the same or different hydrocarbyl radicals or organometalloid radicals having from 1 to 20 carbon atoms.

$Ar_1$ and $Ar_2$ may be linked to one another. In addition, either or both of $Ar_1$ and $Ar_2$ may be linked to either $X_3$ or $X_4$ and $X_3$ and $X_4$ may be linked to one another through a suitable bridging group.

Boron compounds which may be used in the present invention include trialkyl-substituted ammonium salts such as for example triphenylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tri(n-butyl)ammonium tetra(o-tolyl)boron.

N,N-dialkyl anilium salts can be used, such as for example N,N-dimethylanilium tetra(phenyl)boron, N,N-diethylanilium tetra(phenyl)boron, N,N-2,4,6 pentamethylanilium tetra(phenyl)boron.

Dialkyl ammonium salts can be used such as for example di-(1-propyl)ammonium tetra(pentafluorophenyl)boron, dicyclohexylammonium tetra(phenyl)boron.

Triaryl phosphonium salts can be used such as for example triphenylphosphonium tetra(phenyl)boron, tri(methylphenyl)phosphonium tetra(phenyl)boron, tri(dimethylphenyl)phosphonium tetra(phenyl)boron.

The activation processes and structure-activity relationships of several activating agents such as (perfluoroaryl)boranes and aluminates are disclosed in Chen and Marks (Chen E. Y-X., Marks T. J., in "Cocatalysts for metal-catalysed olefin polymerisation: activators, activation processes, and structure-activity relationship.", Chem. Rev. 100, 1391-1434, 2000.) The role of borane and aluminate activating agents for tuning cation-anion ion pair structure and reactivity is disclosed in Chen et al. (Chen E. Y-X., Metz M. V., Li L., Stern C., Marks T. J., in "Sterically encumbered (perfluoroaryl) borane and aluminate cocatalysts for tuning cation-anion ion pair structure and reactivity in metallocene polymerisation processes. A synthetic, structural, and polymerisation study.", J. Am. Chem. Soc., 120, 6287-6305, 1998.). These two publications demonstrate the weak coordination capability of these borane and aluminate compounds: they are thus very suitable for use as activating agent in the present invention.

In addition, one or more aluminium alkyl can optionally be used as cocatalyst(s). They are represented by the formula $AlR_x$ wherein each R is the same or different and is selected from halides or from alkoxy or alkyl groups having from 1 to 12 carbon atoms and x is from 1 to 3. Especially suitable aluminiumalkyl are trialkylaluminium, the most preferred being triisobutylaluminium (TIBAL).

The catalyst system may be employed in a solution polymerisation process, which is homogeneous, or a slurry process, which is heterogeneous. In a solution process, typical solvents include hydrocarbons having from 4 to 7 carbon atoms such as heptane, toluene or cyclohexane. In a slurry process it is necessary to immobilise the catalyst system on an inert support, particularly a porous solid support such as talc, inorganic oxides and resinous support materials such as polyolefins. Preferably, the support material is an inorganic oxide in its finely divided form.

Suitable inorganic oxide materials that may be employed in accordance with this invention include group IIA, IIIA, IVA, or IVB metal oxides such as silica, alumina and mixtures thereof. Other inorganic oxides that may be employed either alone or in combination with the silica, or alumina are for example magnesia, titania or zirconia. Other suitable support materials comprise for example finely divided functionalised polyolefins such as finely divided polyethylene.

Preferably, the support is a silica support having a specific surface area of from 200 to 700 m²/g and a pore volume of from 0.5 to 3 ml/g.

The two or more catalyst components can be immobilised on the same support or on different supports.

The relative amounts of the hafnocene-based catalyst component and of the other one or more metallocene catalyst component(s) depend upon the desired properties of the final resin. The amount of hafnocene-based component can range from 10 to 90 wt % of the total weight of the hafnocene and other metallocene catalyst components. For applications such as pipes, the amount of hafnocene-based component is typically of no more than 50 wt %, based on the weight of all metallocene components, preferably it is of from 35 to 49 wt %.

The amounts of activating agent and of total metallocene components usefully employed in the preparation of the catalyst system can vary over a wide range. When a boron-based activating agent is used, the amount of boron is near stoichiometric with respect to the total amount of metal present in the hafnocene-based and in the one or more other metallocene catalyst components. The boron (B) to total metal ($\Sigma M$) ratio B/$\Sigma M$ is in the range between 1:2 and 2:1, preferably, it is about 1:1.

The order of addition of the catalyst components and activating agent to the support material can vary. In accordance with a preferred embodiment of the present invention, the boron-based activating agent dissolved in a suitable inert hydrocarbon solvent is added to the support material slurried in the same or another suitable hydrocarbon liquid and thereafter the catalyst components are added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane; cycloalkanes such as cyclopentane, cyclohexane, and aromatics such as benzene, toluene, ethylbenzene and diethylbenzene.

Preferably, the support material is slurried in toluene and the catalyst components and activating agent are dissolved in toluene prior to addition to the support material.

The present invention further discloses a process for preparing a catalyst system that comprises the steps of:

A. providing a first hafnocene-based metallocene catalyst component suitable for producing the high molecular weight fraction of the polyolefin and of the general formula

  (I)

or of the general formula

  (II)

wherein
- each Cp is a substituted or unsubstituted cyclopentadienyl ring;
- each R is the same or different and is hydrogen or a hydrocarbyl radical such as alkyl, alkenyl, aryl, alkylaryl or arylalkyl radical containing from 1 to 20 carbon atoms or two carbon atoms are joined together to form a $C_4$-$C_6$ ring;
- R" is a structural bridge between two Cp rings;
- M is hafnium;
- Q is a hydrocarbyl radical such as aryl, alkyl, alkenyl, alkylaryl or arylalkyl radical having from 1 to 20 carbon atoms, a hydrocarboxy radical having from 1 to 20 carbon atoms or a halogen and can be the same or different from each other;
- s is 0 or 1, g is 0, 1 or 2 and s is O when g is O, n is 4 when s is 1 and n is 5 when s is 0;
- X is an heteroatom ligand with one or two lone pair electrons and selected from the group VA or VIA, substituted or unsubstituted.

B. providing one or more metallocene or post-metallocene catalyst components different from component A, suitable for producing the low molecular weight fraction of the polyolefin;

C. activating the hafnocene-based and the one or more metallocene catalyst components with an activating agent having an ionising action, based on a spherically shaped anionogenic agent that can distribute the negative charge evenly, and that has a low or no co-ordinating capability;

D. optionally immobilising the catalyst components on an inorganic support.

The catalyst systems of the present invention can be used to produce polyolefins with broad molecular weight distribution because the hafnocene-based catalyst component has an excellent comonomer incorporation and is capable of producing the high molecular weight fraction. The one or more additional metallocene catalyst components have a good response to hydrogen and are responsible for the low molecular weight fraction of the final polyolefins: they are selected according to the desired polymer properties. For example, if a syndiotactic polypropylene is desired, the metallocene catalyst component preferably has bilateral Cs symmetry such as for example in the fluorenyl-type group. If an isotactic polypropylene is prepared, the metallocene catalyst component preferably has C2 symmetry such as for example in the indenyl-type group.

The present invention thus further discloses a process for the preparation of polyolefins having a broad, bi- or multimodal molecular weight distribution comprising the steps of;

A. providing a catalyst system comprising:
- a hafnocene-based catalyst component suitable for producing the high molecular weight fraction of the polyolefin;
- one or more metallocene or post-metallocene catalyst components different from component A and suitable for producing the low molecular weight fraction of the polyolefin;
- an activating agent having a low or no co-ordinating capability;

B. optionally providing a cocatalyst;

C. introducing the catalyst system and optional cocatalyst into a polymerisation zone containing an olefin monomer and an optional co-monomer and maintaining the reaction zone under polymerisation conditions;

D. extracting the desired polyolefin having a broad or multimodal molecular weight distribution.

The conditions employed for polymerisation are not particularly limited, provided they are sufficient to effectively polymerise the particular monomer used as a starting material. Preferably, polymerisation takes place in the presence of hydrogen and an alkene co-monomer such as 1-butene or 1-hexene.

Optionally, pre-polymerisation can be carried out.

The polyolefins prepared according to the present invention have a broad, bi- or multi-modal molecular weight distribution with a large molecular weight difference between the high and the low molecular weight fractions. Preferably the molecular weight of the high molecular weight fraction is from 5 times to 15 times larger than the molecular weight of the low molecular weight fraction, more preferably it is about 10 times larger than the molecular weight of the low molecular weight fraction as can be seen on FIG. 1 that represents the molecular weight distribution of a polyethylene prepared with a catalyst system according to the present invention. The weight average molecular weight (Mw) of the high molecular weight fraction is of from 300,000 to 2,000,000. Preferably, it is of from 300,000 to 800,000 and more preferably it is of from 300,000 to 500,000. The high molecular weight fraction of the polyolefin typically has a density of from 0.9 to 0.927 g/cm$^3$, preferably of from 0.908 to 0.926 g/cm$^3$ and more preferably, from 0.912 to 0.925 g/cm$^3$. The density is measured at 23° C. following the method of standard test ASTM D 1505. The high load melt index (HLMI) of the high molecular weight fraction is of from 0.001 to 0.5 g/10 min, preferably of from 0.01 to 0.25 g/10 min. The HLMI and the MI2 are measured following the method of standard test ASTM D 1238 under a load respectively of 21.6 kg and 2.16 kg. The weight average molecular weight (Mw) of the low molecular weight fraction is of from 25,000 to 75,000 and more preferably it is of from 30,000 to 50,000, and the density is of at least 0.950 g/cm$^3$, preferably it is of from 0.970 to 0.990 g/cm$^3$, more preferably of from 0.971 to 0.980 g/cm$^3$. The MI2 is of from 100 to 1000 g/10 min, preferably of from 300 to 1000 g/10 min.

When the polyolefin is used in pipe applications, the density of the final resin is of from is of from 0.949 to 0.960 g/cm³, more preferably of from 0.952 to 0.958 g/cm³ and the HLMI is of from 5 to 90 g/10 min, more preferably of from 10 to 80 g/10 min.

When the polyolefin is used in blow moulding applications, the density of the final resin is of from 0.925 to 0.970 g/cm³ and the HLMI is of from 0.5 to 100 g/10 min.

The molecular weight distribution is defined by the polydispersity index D that is the ratio Mw/Mn of the weight average molecular weight Mw to the number average molecular weight Mn, as determined by gel permeation chromatography (GPC). The molecular weight distribution typically ranges from 4 to 20, preferably from 7 to 14.

The invention claimed is:

1. A metallocene catalyst system for producing a polyolefin having a molecular weight distribution of from 7 to 20 comprising:
   (a) a first constituent comprising a bridged hafnocene-based catalyst component having at least one cyclopentadienyl group effective for producing a high molecular weight fraction, based on a weight average molecular weight of the polyolefin, and wherein the hafnocene-based catalyst component has a structure according to formula II:

   $$R''(CpR_n)_g HfXQ_{3-g} \quad (II)$$

wherein:
   each Cp is a substituted or unsubstituted cyclopentadienyl ring;
   each R is the same or different and is hydrogen or a hydrocarbyl radical containing from 1-20 carbon atoms or 2 carbon atoms are joined together to form a $C_4$-$C_6$ ring;
   R'' is a structural bridge between two Cp rings;
   Q is a hydrocarbyl radical having from 1-20 carbon atoms or a halogen and can be the same or different from each other;
   n is 4;
   g is 2; and
   X is a hetero atom ligand wherein the hetero atom is nitrogen, phosphorus, oxygen or sulfur;
   (b) a second constituent comprising at least one metallocene or post-metallocene component different from component (a) and effective for producing a low molecular weight fraction, based on a weight average molecular weight, of the polyolefin and wherein the metallocene catalyst component is an unbridged zirconocene substituted with at least one bulky substituent and the post-metallocene catalyst component is an iron complex of a 2,6-bis(imino)pyridyl ligand; and
   (e) an activating agent having a low or no coordinating capability and selected from the group consisting of a borate, a borane or an aluminate.

2. The metallocene catalyst system of claim 1 wherein the hafnocene-based component has no more than two substituents on each cyclopentadienyl.

3. The metallocene catalyst system of claim 1 wherein the hafnocene-based component comprises:
   (a) at least one cyclopentadienyl-type group having at least one non-hydrogen substituent at the 3 or 5 position; or
   (b) at least one fluorenyl-type group having at least one non-hydrogen substituent at the 3 or 6 position; or
   (c) at least one indenyl-type group having at least one non-hydrogen substituent at the 2 or 4 position.

4. The metallocene catalyst component of claim 3 wherein said hafnocene-based component comprises:
   (a) at least one cyclopentadienyl-type group having two substituents at the 3 and 5 positions; or
   (b) at least one fluorenyl-type group having two substituents at the 3 and 6 positions; or
   (c) at least one indenyl-type group having two substituents at the 2 and 4 positions.

5. The metallocene catalyst system of claim 3 wherein the bridge in the hafnocene-based catalyst component is an ethylene or dimethylsilyl group.

6. The metallocene catalyst system of claim 5 wherein Q in the hafnocene-based catalyst component is chlorine.

7. The metallocene catalyst of claim 1 further comprising a co-catalyst.

8. The metallocene catalyst system of claim 7 wherein said co-catalyst is an aluminum alkyl.

9. The metallocene catalyst system of claim 1 further comprising an inert inorganic support.

10. The metallocene catalyst system of claim 9 wherein the inorganic support is silica having a specific surface area within the range of 200-700 m²/g and a pore volume within the range of 0.5-3 ml/g.

11. The metallocene catalyst system of claim 1 wherein said first constituent is present in an amount within the range of 10-90 wt % of the composite amount of said first constituent and said second constituent.

12. The metallocene catalyst system of claim 11 wherein said first constituent is present in an amount of no more than 50 wt % of the composite amount of said first and second constituents.

13. The metallocene catalyst system of claim 11 wherein said first constituent is present in an amount within the range of 35-49 wt % of the composite amount of said first and second constituents.

14. A process for the polymerization of an olefin comprising:
   (a) providing a metallocene catalyst system for producing a polyolefin having a molecular weight distribution of from 7 to 20 comprising:
      (1) a first constituent comprising a bridged hafnocene-based catalyst component having at least one cyclopentadienyl group effective for producing a high molecular weight fraction, based on a weight average molecular weight of the polyolefin, and wherein the hafnocene-based catalyst component has a structure according to formula II:

      $$R''(CpR_n)_g HfXQ_{3-g} \quad (II)$$

wherein:
      each Cp is a substituted or unsubstituted cyclopentadienyl ring;
      each R is the same or different and is hydrogen or a hydrocarbyl radical containing from 1-20 carbon atoms or 2 carbon atoms are joined together to form a $C_4$-$C_6$ ring;
      R'' is a structural bridge between two Cp rings;
      Q is a hydrocarbyl radical having from 1-20 carbon atoms or a halogen and can be the same or different from each other;
      n is 4;
      g is 2; and
      X is a hetero atom ligand wherein the hetero atom is nitrogen, phosphorus, oxygen or sulfur;
      (2) a second constituent comprising at least one metallocene or post-metallocene component different from said first constituent and effective for producing a low molecular weight fraction, based on a weight average molecular weight, of the polyolefin and wherein the metallocene catalyst component is an unbridged zirconocene substituted with at least one bulky substituent and the post-metallocene catalyst component is an iron complex of a 2,6-bis(imino)pyridyl ligand;

(3) an activating agent having a low or no coordinating capability and selected from the group consisting of a borate, a borane or an aluminate;

(b) introducing an olefin monomer and said metallocene catalyst system into a polymerization reaction zone;

(c) maintaining said reaction zone under polymerization conditions and polymerizing said olefin monomer to produce a polymer of said monomer having a high molecular weight fraction and a low molecular weight fraction; and (d) extracting said polymer having said high molecular weight and low molecular weight fractions from said polymerization reaction zone.

15. The process of claim 14 wherein said olefin is selected from the group consisting of ethylene and propylene and the polymer recovered from said reaction zone comprises at least one of an ethylene or propylene polymer.

16. The process of claim 14 wherein the weight average molecular weight of the high molecular weight fraction is from 5-15 times greater than the weight average molecular weight of said low molecular weight fraction.

* * * * *